United States Patent
Tejima (10) Patent No.: US 8,002,416 B2
(45) Date of Patent: Aug. 23, 2011

(54) DISTANCE MEASURING DEVICE AND PROJECTOR INCLUDING SAME DISTANCE MEASURING DEVICE

(75) Inventor: Yasuyuki Tejima, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 511 days.

(21) Appl. No.: 12/204,204

(22) Filed: Sep. 4, 2008

(65) Prior Publication Data

US 2009/0059183 A1 Mar. 5, 2009

(30) Foreign Application Priority Data

Sep. 5, 2007 (JP) ................................ 2007-230637

(51) Int. Cl.
  *G03B 21/00* (2006.01)
  *G03B 21/14* (2006.01)
  *G01C 3/08* (2006.01)
(52) U.S. Cl. ........................................ 353/70; 356/4.01
(58) Field of Classification Search .............. 353/69–70, 353/122; 356/4.01, 4.08, 5.01, 5.04; 348/745, 348/806
See application file for complete search history.

(56) References Cited

U.S. PATENT DOCUMENTS 4,786,164 A * 11/1988 Kawata .................... 356/5.05

(Continued)

FOREIGN PATENT DOCUMENTS

JP 2-59691 A 2/1990

(Continued)

OTHER PUBLICATIONS

Japanese Office Action dated Aug. 20, 2009 (3 pages), and English translation thereof (3 pages), issued in counterpart Japanese Application Serial No. 2007-230637.

(Continued)

*Primary Examiner* — Georgia Y Epps
*Assistant Examiner* — Jori S Reilly-Diakun
(74) *Attorney, Agent, or Firm* — Holtz, Holtz, Goodman & Chick, PC (57) ABSTRACT

There are provided a small distance measuring device which enables an accurate distance measurement and has a wide range of measurable distances and a projector which is provided with the distance measuring device.
A projector includes a light source unit, a light source side optical system for guiding light from the light source unit to a display device, the display device, a projection side optical system for projecting an image emitted from the display device on to a screen, and a distance measuring device and has a projector control unit for controlling the light source unit and the display device, and the distance measuring device includes a distance calculating part for calculating distances to a plurality of point on the screen and a mean distance thereof, and the projector control means includes an inclination angle calculating part for calculating an inclination angle of the screen based on the distances to the plurality of points on the screen calculated by the distance calculating part and a distortion correcting part for preparing image data of a projected image which has been corrected for distortion from information calculated by the distance calculating part 45 and the inclination calculating part.

7 Claims, 12 Drawing Sheets

U.S. PATENT DOCUMENTS

| | | | | |
|---|---|---|---|---|
| 4,948,246 | A * | 8/1990 | Shigematsu | 356/5.08 |
| 6,281,968 | B1 * | 8/2001 | Seifert et al. | 356/3.03 |
| 6,603,534 | B2 * | 8/2003 | Seifert et al. | 356/4.01 |
| 6,862,086 | B2 * | 3/2005 | Kanemitsu | 356/139.1 |
| 7,204,596 | B2 * | 4/2007 | Tamura | 353/70 |
| 7,252,388 | B2 * | 8/2007 | Ogawa | 353/70 |
| 7,600,876 | B2 * | 10/2009 | Kurosu et al. | 353/69 |
| 7,623,779 | B2 * | 11/2009 | Inoue et al. | 396/116 |
| 7,661,826 | B2 * | 2/2010 | Iwanaga | 353/69 |
| 2006/0256299 | A1 * | 11/2006 | Saito | 353/70 |

FOREIGN PATENT DOCUMENTS

| | | |
|---|---|---|
| JP | 5-135281 A | 6/1993 |
| JP | 7-253461 A | 10/1995 |
| JP | 7-270602 A | 10/1995 |
| JP | 2005-6228 A | 1/2005 |

OTHER PUBLICATIONS

Chinese Office Action dated Mar. 10, 2011(and English translation thereof) in counterpart Chinese Application No. 200810212572.0.

* cited by examiner

DISTANCE MEASURING DEVICE AND PROJECTOR INCLUDING SAME DISTANCE MEASURING DEVICE

CROSS-REFERENCE TO RELATED APPLICATIONS

This application is based upon and claims the benefit of priority from the prior Japanese Patent Application No. 2007-230637, filed on Sep. 6, 2007; the entire contents of which are incorporated herein by reference.

BACKGROUND OF THE INVENTION

The present invention relates to a projector and a distance measuring device which is suitable for equipment on a projector.

In these days, many data projectors are in use for projecting various types of images such as images displayed on screens of personal computers, images of video signals and, furthermore, images based on image data stored in memory cards on to screens.

In many such data projectors, a configuration is adopted in which a light source which is small in size and which has a high luminous intensity such as a metal halide lamp or an extra-high pressure mercury vapor lamp is used, light emitted from this light source is made into light rays of the three primary colors by a color filter and is then shone on to a liquid crystal or DMD (Digital Micromirror Device) display device via a light source side optical system, so that light that has passed through or been reflected on the display device is projected on to a screen via a group of lenses which is referred to as a projection side optical system having a zooming function.

In these projectors, there may be caused a situation where a trapezoidal distortion is generated in a projected image due to a distance between a screen and the projector, an inclination angle of the screen and a projection angle. Then, in order to correct such a trapezoidal distortion (a keystone distortion correction), it becomes necessary to measure accurately the distance between the screen and the projector, the inclination angle of the screen and the projection angle. To make this happen, a distance measuring device needs to be provided on the projector.

In the Japanese Unexamined Patent Application No. 2005-006228, for example, there is proposed a technique in which a distance measuring device for measuring distances to two points in a vertical direction and a distance measuring device for measuring distances to two points in a horizontal direction are disposed in the vicinity of a projection port, so as to calculate an inclination of a screen using the two distance measuring devices.

A distance measuring device on a general projector includes a light source, a photodetector or light receiving element and a light receiving lens, whereby light is emitted from the light source towards a distance measuring object, light reflected on the distance measuring object is made to be collected to the light receiving element by the light receiving lens, and the reflected light is made to be received by the light receiving element for calculation of a distance to the distance measuring object. In the distance measuring device, light reflected on the distance measuring object needs to be incident on the light receiving element in an ensured fashion. However, since a position where reflected light is collected by the light receiving lens deviates depending upon a distance to the distance measuring object, there is imposed a limitation on the distance of reflected light from the distance measuring object that can be received by the light receiving element, leading to a problem that the measurable range by the distance measuring device is limited.

In this way, in the distance measuring device of the conventional projector, the place to collect the reflected light from the distance measuring object changes, and this has sometimes made it difficult for such reflected light to be incident on the light receiving element. Because of this, in order to expand the range of incidence of reflected light on the light receiving element, there have been proposed several countermeasures such as increasing the size of the light receiving device, disposing a plurality of light receiving lenses or installing a reflection mirror in the vicinity of the light receiving element. However, these countermeasures call for an increase in size of the distance measuring device, and it has been difficult to install such an enlarged distance measuring device on a projector for which miniaturization has been demanded in these days.

Then, the present invention has been made in these situations, and an object thereof is to provide a small distance measuring device which can measure a distance accurately and which has a long measuring distance and a projector which includes this small distance measuring device.

SUMMARY OF THE INVENTION

According to an aspect of the invention, there is provided a distance measuring device having a light source for emitting light to a distance measuring object, a light receiving element for receiving light which has been reflected on the distance measuring object and a light receiving lens for collecting reflected light from the distance measuring object, wherein the light receiving element is disposed closer to the light receiving lens than a focal point position where reflected light from the distance measuring object is collected by the light receiving lens.

In addition, according to another aspect of the invention, there is provided a projector including a light source unit, a light source side optical system for guiding light from the light source unit to a display device, the display device, a projection side optical system for projecting an image emitted from the display device on to a screen and the distance measuring device according to the aforesaid aspect of the invention in which the light receiving element is disposed closer to the light receiving lens than a focal point position where reflected light from the distance measuring object is collected by the light receiving lens.

DESCRIPTION OF THE PREFERRED EMBODIMENT

A projector 10 according to a best mode for carrying out the invention includes a light source unit 62, a light source side optical system which guides light from the light source unit 62 to a display device 50, the display device 50, a projection side optical system which projects an image emitted from the display device 50 on to a screen, a distance measuring device 1 and a projector control unit for controlling the light source unit and the display device 50.

This distance measuring device 1 has a plurality of laser light sources 2 for emitting laser beams towards a plurality of distance measuring objects, a single light receiving element 3 for receiving light reflected on the plurality of distance measuring objects and a light receiving lens 4 for collecting reflected light from the plurality of distance measuring objects. The light receiving element 3 is disposed closer to the light receiving lens 4 than focal point positions where reflected light from the distance measuring objects is collected by the light receiving lenses 4.

In addition, a sectional shape of a laser beam emitted from the laser light source 2 has an elliptic shape, and the laser light source 2 is disposed such that the direction of a laser emitting point relative to the direction of an optical axis of the light receiving element 3 coincides with the direction of a major axis of an ellipse which constitutes the sectional shape of the laser beam.

Furthermore, the light receiving lens 4 has a disc shape in which a plurality of sector light collective lenses are arranged side by side in a circumferential direction, and a predetermined one of the collective lenses is paired with one of the plurality of laser light sources 2. The light receiving element 3 is disposed in the vicinity of a position where optical axes of the plurality of collective lenses installed in the light receiving lens 4 intersect.

In addition, the projector control unit includes a distance calculation part 45 for calculating distances to a plurality of points on the screen and a mean distance of the distances to the plurality of points, an inclination angle calculating part 46 for calculating an inclination angle of the screen based on the distances to the plurality of points on the screen which were calculated by the distance calculating part 45 and a distortion correcting part 47 for preparing image data of a projected image which is corrected for distortion from information resulting from the calculations at the distance calculating part 45 and the inclination angle calculating part 46.

Hereinafter, an embodiment of the invention will be described based on the accompanying drawings.

Figure 1:
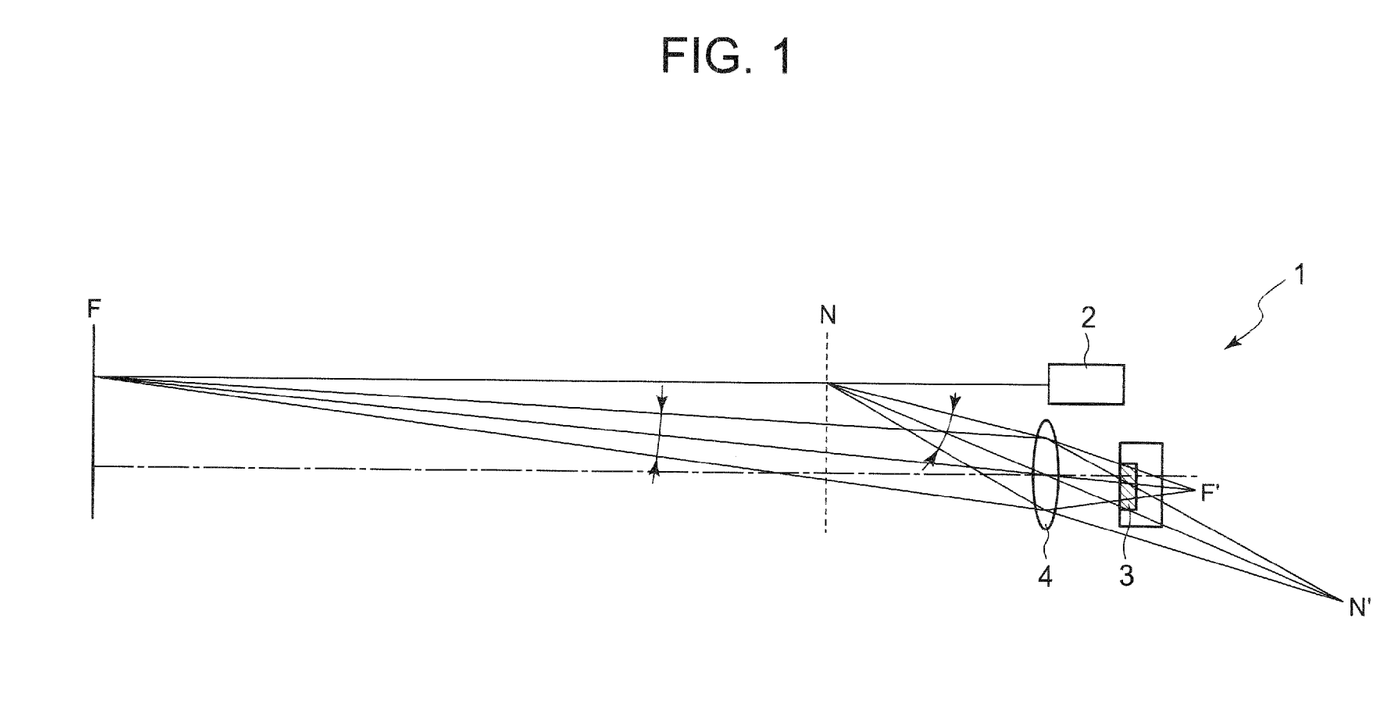
FIG. 1 is a schematic block diagram of a distance measuring device according to an embodiment of the invention.

As is shown in FIG. 1, a distance measuring device 1 according to an embodiment of the invention is an optical distance measuring device which includes a laser light source 2 for emitting a laser beam towards a distance measuring object a distance to which is to be measured, a single light receiving element 3 for receiving light reflected on the distance measuring object, and a light receiving lens 4 for emitting reflected light from the distance measuring object towards the light receiving element 3.

Figure 2:
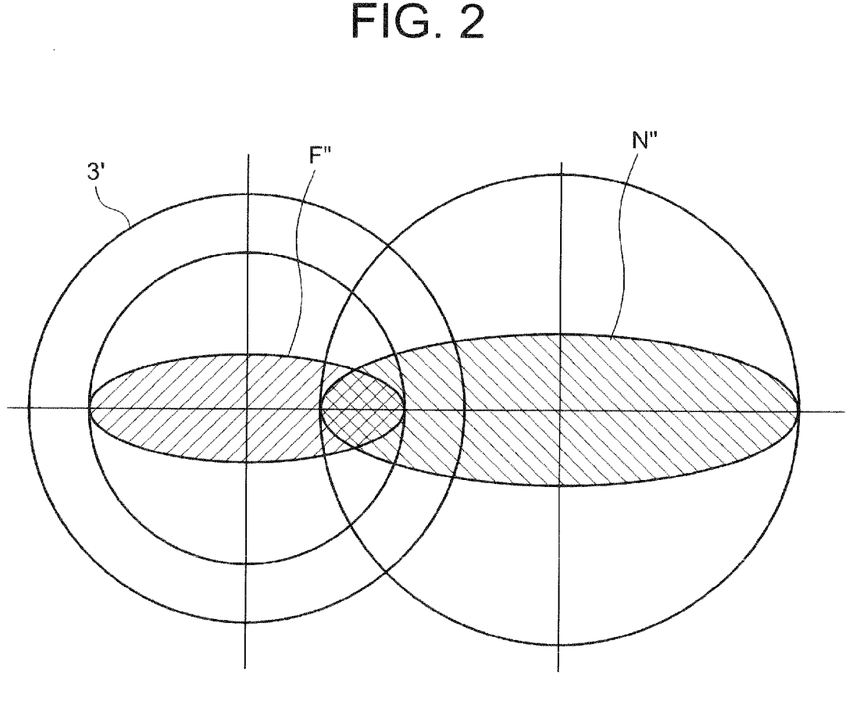
FIG. 2 is a sectional view of light emitted from a laser light source of the distance measuring device according to the embodiment of the invention.

The laser light source 2 is such as to emit a laser beam, which is a straight light beam, towards the distance measuring object and is time-division controlled by a frequency determined by a laser light source control unit. In addition, a cross-sectional shape of the laser beam is not a true circular shape but an elliptic shape, as is shown in FIG. 2.

The light receiving element 3 is a highly sensitive light receiving element 3 such as an avalanche photodiode (APD) for amplifying an optical signal by making use of avalanche multiplication effect produced by electron avalanche effect and is such as to be used as a light receiving element 3 in a commercially available laser distance meter. The light receiving element 3 receives a laser beam emitted from the laser light source 2 and reflected on the distance measuring object, converts the laser beam so received to an electric signal and transmits this electric signal to a computing unit or the like for calculation of a distance from a phase difference between transmission time and reception time.

The light receiving lens 4 is a lens for collecting the laser beam reflected on the distance measuring object to emit the laser beam so collected towards the light receiving element 3 and is such as to be disposed on an optical axis of light which is part of the reflected light from the distance measuring object and which travels towards the light receiving element 3.

In the distance measuring device 1 that is configured as has been described heretofore, a focal point position of light emitted from the light receiving lens 4 deviates depending upon a distance to the distance measuring object. Namely, as is shown in FIG. 1, when comparing a focal point position F' of reflected light which is reflected on a distance measuring object at a long distance or in a far position F with a focal point position N' of reflected light which is reflected on a distance measuring object at a short distance or in a near position N, the focal point N' deviates further downwards than the focal point position F' as is shown in the figure. Consequently, in the event that an incident plane of the light receiving element 3 is disposed in the focal point position F' of the reflected light from the far position, since the reflected light from the near position which converges on the focal point position N' is not incident on the incident plane of the light receiving element 3, there may occur occasions when a distance to a near object cannot be measured. To cope with this, measures are called for, and for example, the incident plane of the light receiving element 3 is made large in size so as to allow the light receiving element 3 to receive reflected light from a near position as well, or a reflection mirror is provided on the optical axis of reflected light from the near position so that reflected light from the near position is reflected on the reflection mirror so as to be incident on the light receiving element 3. These measures disturb the miniaturization of the distance measuring device 1.

Then, in the distance measuring device 1 of the embodiment, the light receiving element 3 is made to be disposed closer to the light receiving lens 4 than a focal point position of the light receiving lens 4 in such a state that a center of the incident plane of the light receiving element 3 is positioned on an optical axis which results when reflected light of light emitted from the laser light source 2 of the distance measuring device 1 to a distance measuring object lying in a far position such as a point of infinity passes through the light receiving lens 4. By the light receiving element 3 being made to approach the light receiving lens 4 on the optical axis of the light receiving lens 4 in the way described above, reflected light which converges on the focal point position F' is made to be shone on to the incident plane of the light receiving element 3 in an ensured fashion, while part of reflected light from the near position which converges on the focal point position N' is made to be shone on to the incident plane of the light receiving element 3. Thus, all the light of the reflected light from the far position that passes through the light receiving lens 4 is received by the light receiving element 3, while part of the strong reflected light from the near position that passes through the light receiving lens 4 is received by the light receiving element 3, whereby distances to both the distance measuring object in the far position and the distance measuring object in the near position can be measured without adopting the measures of increasing the incident plane of the light receiving element 3 and the like.

Namely, when comparing the optical power of reflected light when a projection distance is long or 5 m with the optical power of reflected light when the projection distance is short or 0.5 m, since the optical power is in inverse proportion to the square of distance, a theoretical received amount of reflected light from the near position becomes extremely large, and there may occur occasions when the theoretic received amount exceeds a dynamic range which is a ratio of minimum optical power to maximum optical power in the light receiving element 3. Consequently, by the optical axis of reflected light from the far position being disposed in such a way as to pass through the center of the light receiving element 3, all of reflected light from the far position is made to be incident on the light receiving element 3 so that the received amount of reflected light from the far position in the light receiving element 3 is made, while part of reflected light from the near position is made to be incident on the light receiving element 3 as the received amount of reflected light from the near position in the light receiving element 3, so that a distance measurement can be implemented while preventing the received amount from surpassing the dynamic range.

Furthermore, as is shown in FIG. 2, since a sectional shape of a laser beam emitted from the laser light source 2 is not a true circular shape but an elliptic shape, the laser light source 2 is disposed to be mounted such that the direction in which the focal point positions of reflected light from the far position and reflected light from the near position deviate from each other, that is, the direction of a line which connects the direction of the optical axes of the light receiving element 3 and the light receiving lens 4 with the direction of the laser emitting point coincides with the direction of a major axis of the sectional shape of the laser beam. By the arrangement of the laser light source 2 and the light receiving element 3 being determined based on the relationship between the sectional shape of the laser beam, the laser emitting direction and the position of the light receiving lens 4 or the light receiving plane, all of reflected light F" from the far position can be made to be incident on a light receiving plane 3' of the light receiving element 3, while only part of reflected light N" from the near position can be made to be incident on the light receiving plane 3' of the light receiving element 3.

Next, using FIGS. 3 and 4, a specific position of the light receiving element 3 will be described. Letting a maximum measurable distance by the distance measuring device 1 be 5 m, a minimum measurable distance be 0.5 m, an effective diameter of the light receiving lens 4 be 5 mm, a thickness of the light receiving lens 4 be 2 mm, and a designed focal length of the light receiving lens 4 relative to a point of infinity be 21 mm, the light receiving element 3 is positioned 20 mm apart from the light receiving lens 4.

Figure 3:
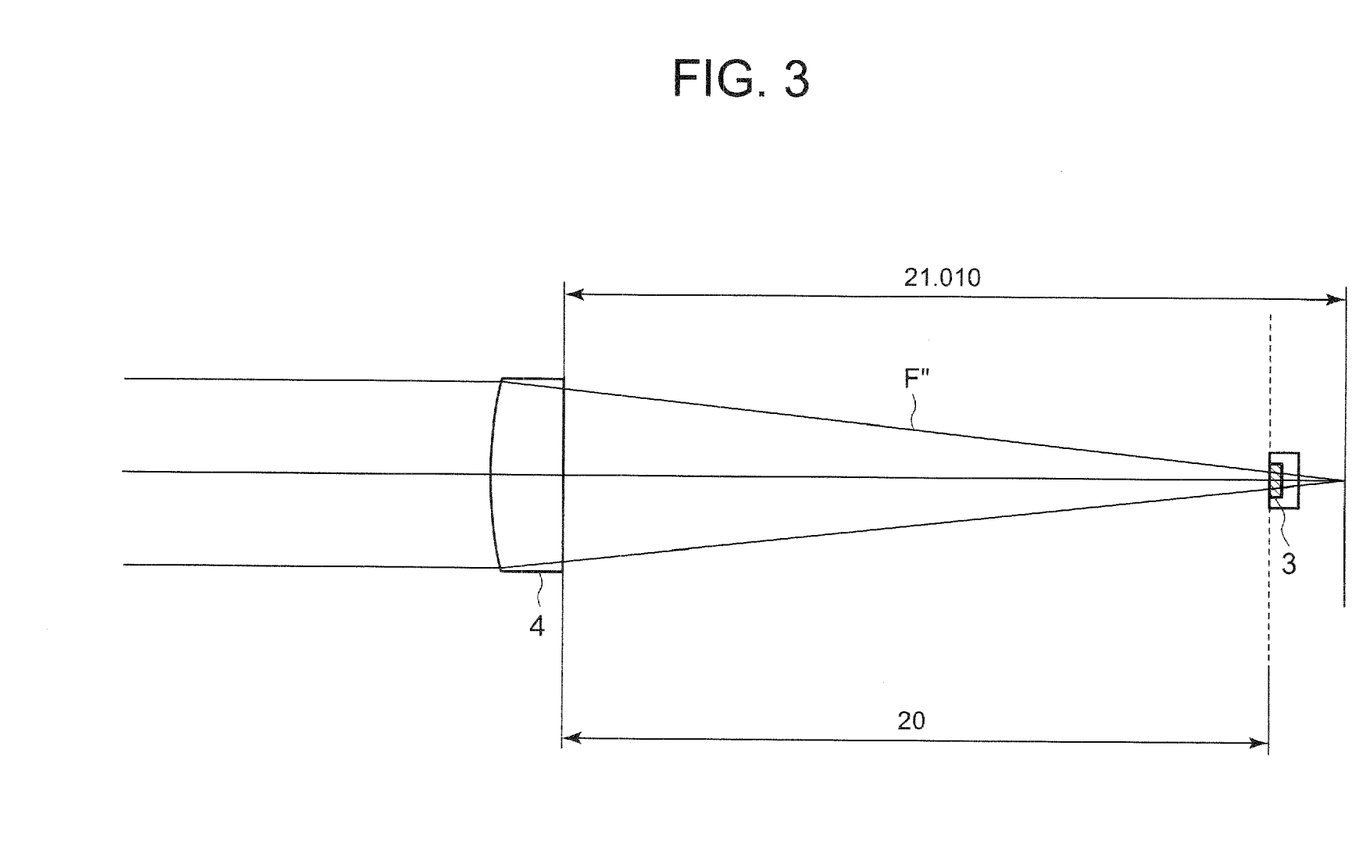
FIG. 3 is a conceptual diagram which illustrates a case where in the distance measuring device of the embodiment, reflected light from a distance measuring object lying at a long distance or in a far position is incident on a light receiving element.
Figure 4:
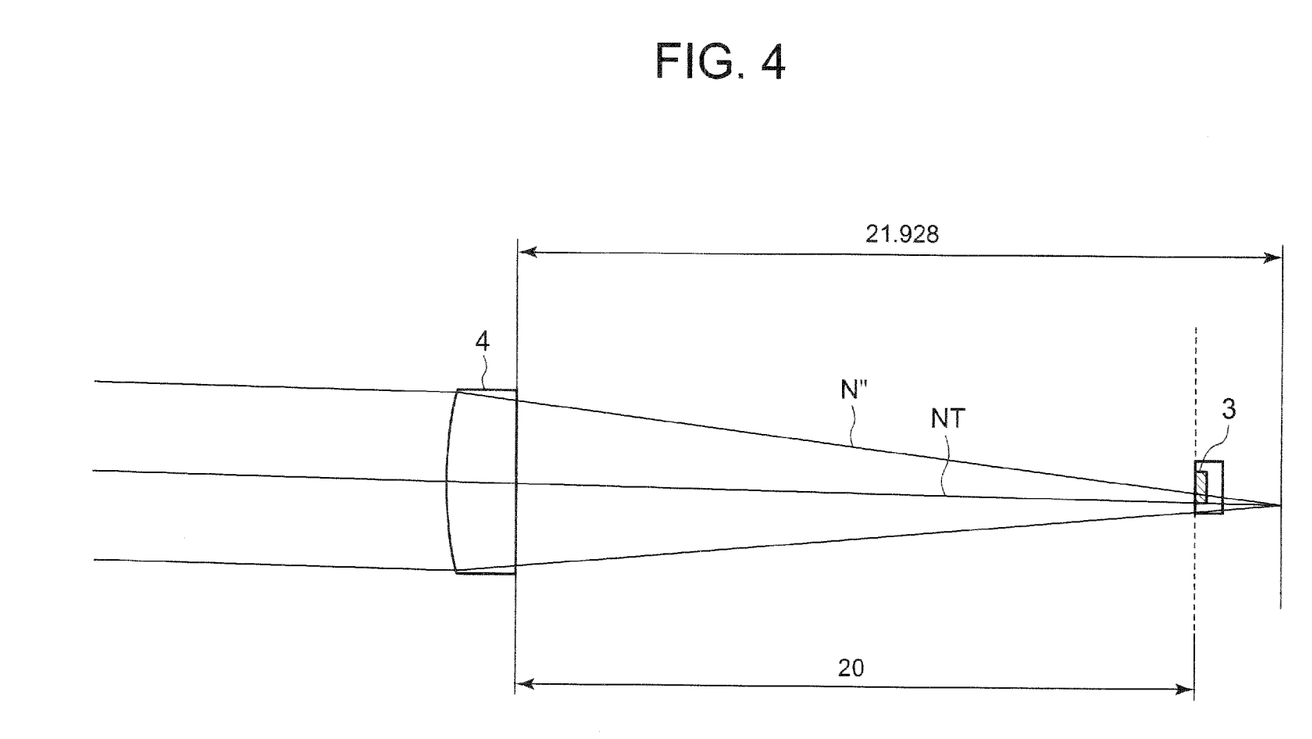
FIG. 4 is a conceptual diagram which illustrates a case where in the distance measuring device of the embodiment, reflected light from a distance measuring object lying at a short distance or in a near position is incident on the light receiving element.

As is shown in FIG. 3, a focal length of reflected light F" from a far position lying 5 m ahead which is the maximum measurable distance by the distance measuring device 1 is 21.010 mm, and it is seen that all light emitted from the light receiving lens 4 is incident on the light receiving element 3. On the other hand, as is shown in FIG. 4, a focal length of reflected light N" from a near position lying 0.5 m ahead which is the minimum measurable distance by the distance measuring device 1 is 21.928 mm, and it is seen that part of the reflected light is incident on the light receiving element 3 although an optical axis NT of the reflected light is not incident on the incident plane of the light receiving element 3. Consequently, it is seen that by the light receiving element 3 being disposed by on the order of 1 mm closer to the light receiving lens 4 than the focal point position of the reflected light from the far position lying 5 m ahead which is the maximum measurable distance by the distance measuring device 1, the distance measurement is enabled in the range of 5 m to 0.5 m.

According to the distance measuring device 1 of the embodiment, by the light receiving element 3 being disposed closer to the light receiving lens 4, the distance measurement can be enabled from the far position to the near position without increasing the incident plane of the light receiving element 3 or disposing the reflection mirror. Consequently, the miniaturization of the distance measuring device 1 can be realized, and the fabrication of the distance measuring device 1 can be facilitated, thereby making it possible to suppress the fabrication costs. Consequently, the installation of the distance measuring device 1 on a small electric appliance can be facilitated.

In addition, by adopting the laser light source as the light source, since the laser beam is a straight light beam and easy to handle, not only can a highly accurate distance measurement be enabled but also the miniaturization of the distance measuring device 1 can be realized.

Furthermore, by the laser light source 2 being disposed such that the laser emitting direction relative to the optical axes of the light receiving element 3 and the light receiving lens 4 coincides with the major axis direction of the ellipse which is the sectional shape of the laser beam, even though the light receiving element 3 is positioned in such a manner as to be aligned with reflected light from the far position, part of reflected light from the near position is allowed to be incident on the light receiving element 3, thereby making it possible to implement a distance measurement over a wide range with the small light receiving element 3.

Figure 5:
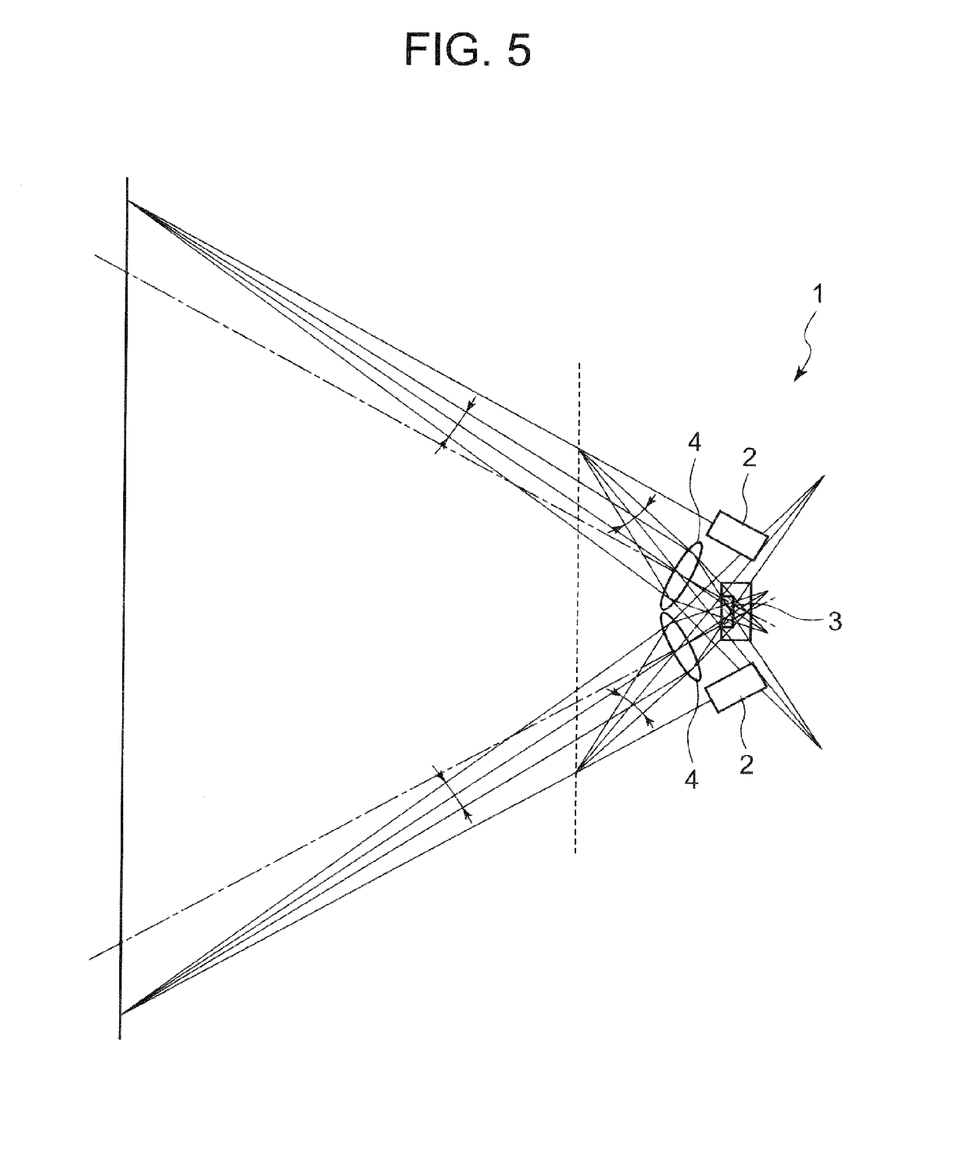
FIG. 5 is a schematic block diagram of the distance measuring device according to the embodiment of the invention in which a plurality of laser light sources are provided.

Next, a case will be described in which distances to a plurality of distance measuring objects are measured by the distance measuring device 1. As is shown in FIG. 5, in this case, the distance measuring device 1 includes a plurality of laser light sources 2, one light receiving element 3 and the same number of light receiving lenses 4 as the number of laser light sources 2. In addition, the light receiving element 3 is disposed in a position which is closer to the light receiving lenses 4 than a position where reflected light which is emitted from the plurality of laser light sources 2, is then reflected on the respective distance measuring objects and finally passes through the respective light receiving lenses 4 intersects. In addition, in order to make the distance measuring device 1 compact, the laser light sources are disposed in the vicinity of the light receiving element 3.

In this way, by the light receiving element 3 being made to be disposed in a position which is closer to the light receiving lenses 4 than the position where reflected light which is emitted from the plurality of laser light sources 2, is then reflected on the respective distance measuring objects and finally passes through the respective light receiving lenses 4 intersects, as with the case where the distance to the single distance measuring object is measured by the distance measuring device 1, since not only can the distance measurement be implemented from the far position to the near position without increasing the incident plane of the light receiving element 3 or disposing the reflection mirror but also distances to the plurality of distance measuring objects can be measured by the single light receiving element 3, the reduction in fabrication costs and miniaturization of the device can be realized.

Figure 6:
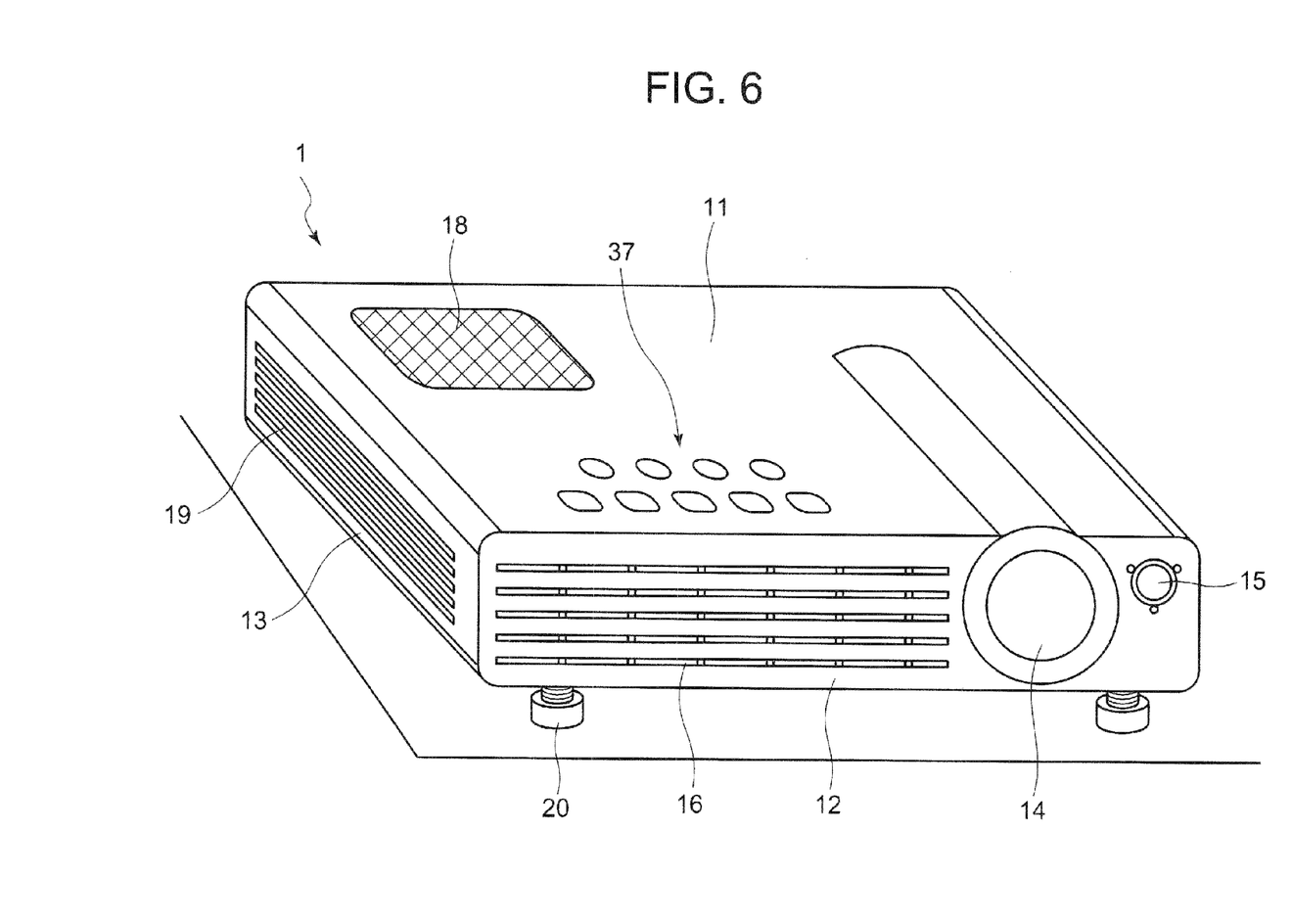
FIG. 6 is a perspective view of a projector according to the embodiment of the invention.

Next, a projector including a distance measuring device like one described above will be described. As is shown in FIG. 6, a projector 10 of this embodiment includes a projection port 14 in the vicinity of an end of a front plate 12 of a main body case, and a distance measuring device 1 which includes the same characteristics of the distance measuring device 1 that has been described above is disposed in the vicinity of the projection port 14. In addition, a plurality of air outlet holes or slots are formed in such a manner as to extend from the vicinity of the projection port 14 as far as the vicinity of the other end of the front plate 12 for discharging therethrough air that has been used to cool the interior of a casing of the projector 10. Furthermore, although not shown in the figure, the projector 10 includes an Ir reception part for receiving a control signal from a remote controller.

In addition, a key/indicator part 37 and a voice output part 18 are provided on an upper plate 11 of the main body case, and provided on this key/indicator part 37 are keys and indicators including a power supply switching key and a power indicator for informing whether the power supply is on or off, a lamp switch key for illuminating a lamp of a light source unit and a lamp indicator for indicating the illumination of the lamp, and an overheat indicator for warning of the overheat of the light source unit.

Furthermore, although not shown in the figure, the projector 10 has on a back plate of the main body case an input/output connector part where USB terminals and image signal input D-SUB terminals, an S terminal, an RCA terminal and the like are provided, as well as various types of terminals such as a power supply adapter plug and a memory card slot.

In addition, the projector 10 has a plurality of air inlet holes or slots 19 on each of a right side plate 13 which is a side plate of the main body case and a left side plate which is a side plate not shown and on a bottom plate which constitutes a bottom side of the main body case a front leg 20 having an extension/contraction function to adjust a projection angle for projection of an image on to a screen with the projector 10 or the projection port 14 inclined upwardly.

Additionally, the projector 10 has in the interior thereof a power supply control circuit board which includes a lamp power supply circuit block and the like and a main circuit block which includes a projector control unit and also includes a cooling fan for reducing an interior temperature of the projector 10, a light source unit of a high luminance which includes a halogen lamp used as a light source, a display device referred to as DMD (Digital Micromirrors Device) which is used to generate images, a light source side optical system for collecting light from the light source towards the display device and a projection side optical system for projecting light emitted from the DMD on to the screen.

This DMD has a plurality of micromirrors which are disposed in a matrix fashion and displays an image by reflecting light incident thereon from an incident direction which is inclined to one direction relative to a front direction into on-state light beams directed to the front direction and off-state light beams directed to an oblique or inclined direction by switching the micromirrors between "on" and "off" positions. Namely, light incident on micromirrors tilted to one sloping direction is reflected to the front direction by the micromirrors to make it on-state light beams, while light incident on micromirrors tilted to the other sloping direction is reflected to the oblique direction by the micromirrors to make it off-state light beams. In addition, the off-state light beams are absorbed by light absorber plates, whereby an image is formed by bright indications resulting from the reflection to the front direction and dark indications resulting from the reflection to the oblique direction.

Figure 7:
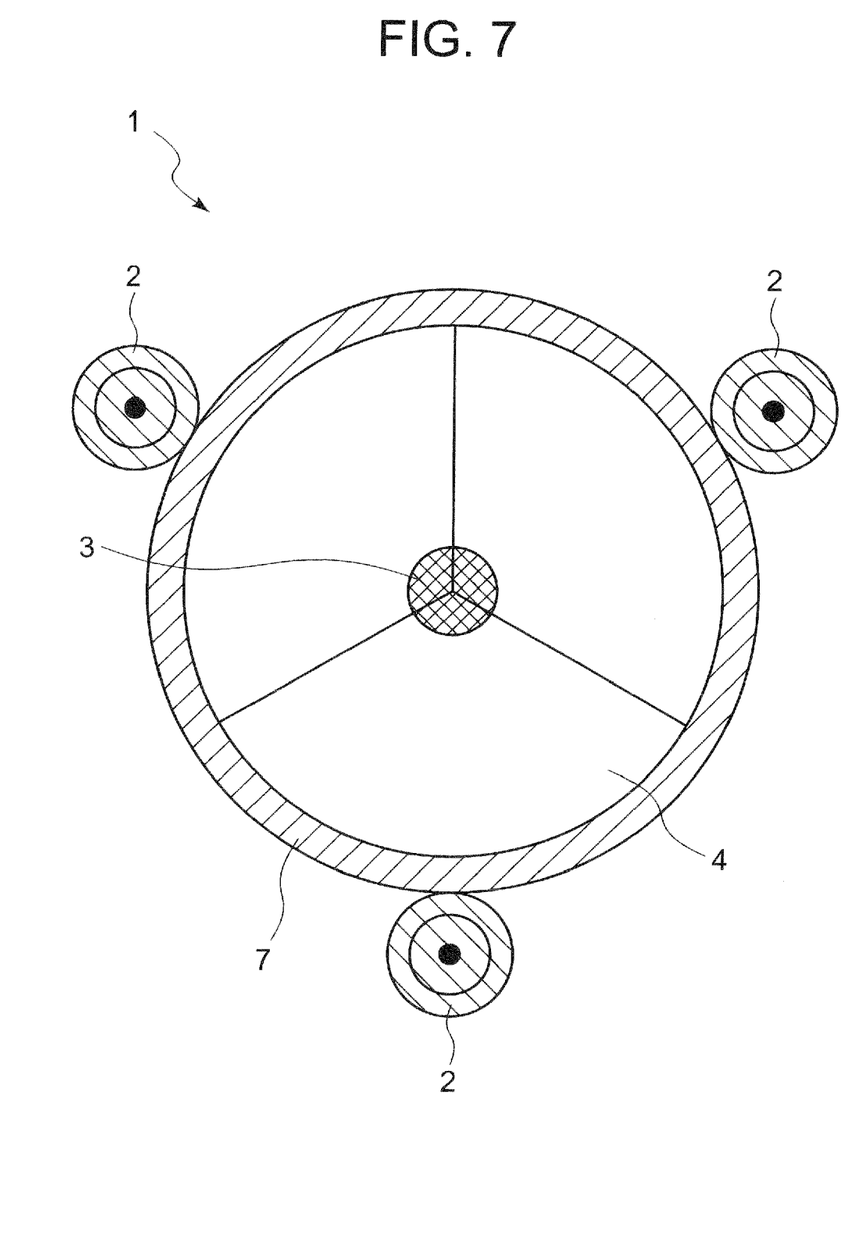
FIG. 7 is a front view of a distance measuring device disposed in the projector according to the embodiment of the invention.
Figure 8:
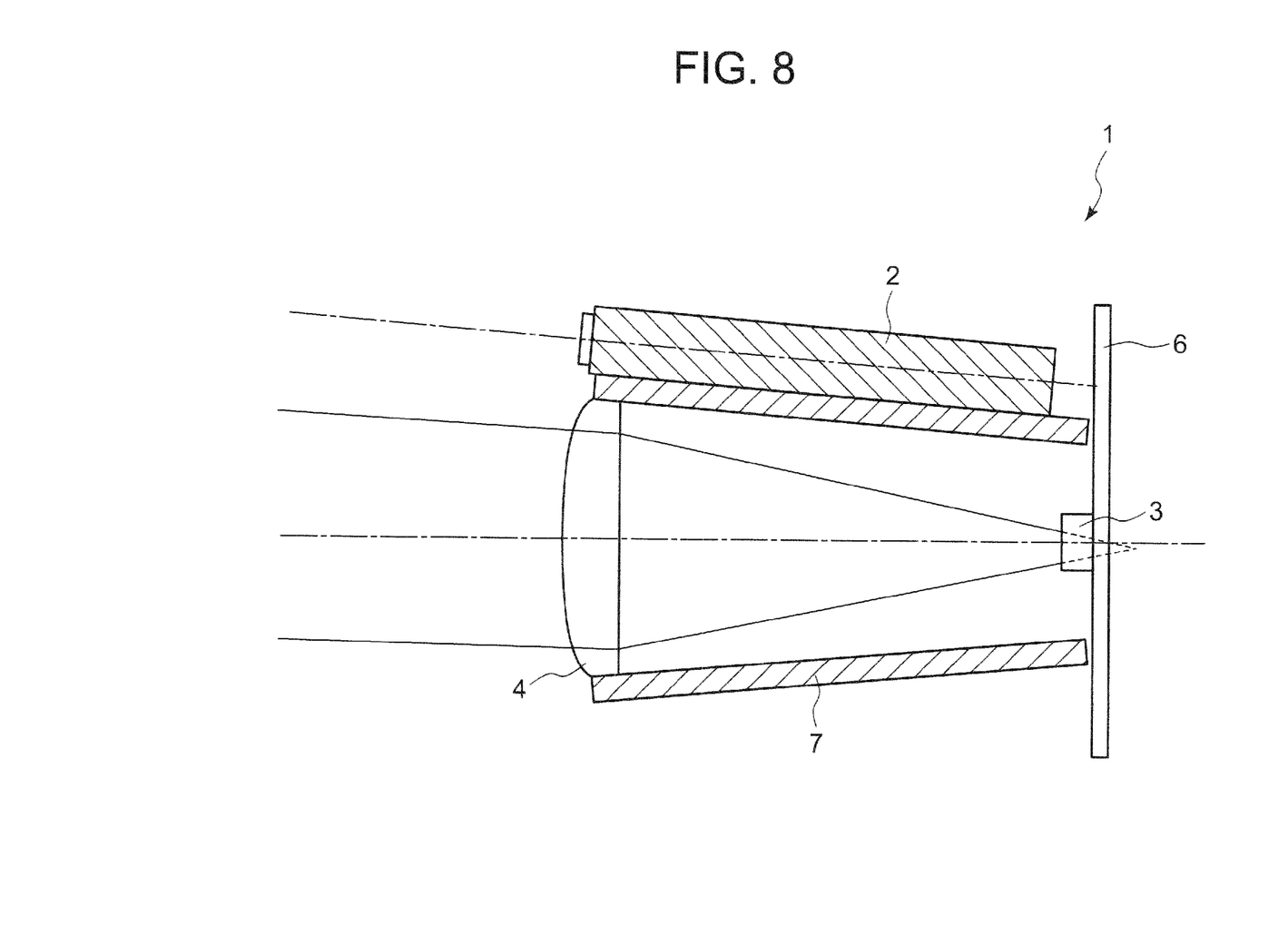
FIG. 8 is a side view of the distance measuring device disposed in the projector according to the embodiment of the invention.

In addition, as is shown in FIGS. 7 and 8, the distance measuring device 1 disposed on the front plate 12 of the projector 10 includes a distance measuring substrate 6, a light receiving element 3 which is fixed to the distance measuring substrate 6, a light receiving barrel 7 which is made up of a cylindrical body of a frustum of circular cone which is made to open at both end faces and which is disposed in such a manner as to cover a circumferential edge of the light receiving unit 3, three laser light sources 2 which are disposed radially to three directions on an outer circumferential surface of the light receiving barrel 7 for emitting laser beams, and a light receiving lens 4 which is disposed at a distal end portion of the light receiving barrel 7.

The light receiving element 3 is fixed to the distance measuring substrate 6, which has a laser light source control part for time-division controlling the laser light sources 2. In addition, there may occur occasions when a distance calculating part 45, which will be described later, is installed on this distance measuring substrate 6 not on a projector control unit, which will be described later, the distance calculating part 45 functioning to calculate distances to a plurality of points on a plane of the screen and a mean distance from electric signals converted by the light receiving element 3.

The light receiving barrel 7 is a cylindrical body of a frustum of circular cone which is made to open at an upper side and a bottom side of the frustum of circular cone, and this light receiving barrel 7 is disposed to prevent the incidence of useless external light on the light receiving element 3. The light receiving element 3 is disposed at a central portion on a narrow open end of the light receiving barrel 7, whereas the light receiving lens 4 is disposed at a wide open end thereof in such a manner as to close a wider open end portion. The light receiving barrel 7 is disposed with its center axis made normal to the distance measuring substrate 6.

In addition, the three laser light sources 2 are disposed at equal intervals in different positions on a circumference of a circle centered at the center of the light receiving element 3. The reason the three laser light sources 2 are used in this way is that although the focal point of a projected image can be adjusted by measuring a distance to one point on the screen, an inclination of the screen needs to be calculated in order to make use of the distance measuring device 1 to correct a distortion such as a keystone distortion correction, and to make this happen, distances to a plurality of different points on the screen need to be measured. Because of this, an inclination of the screen is made to be obtained by obtaining distances between predetermined three points on the screen and the projector 10 using the three laser light sources 2.

Figure 9:
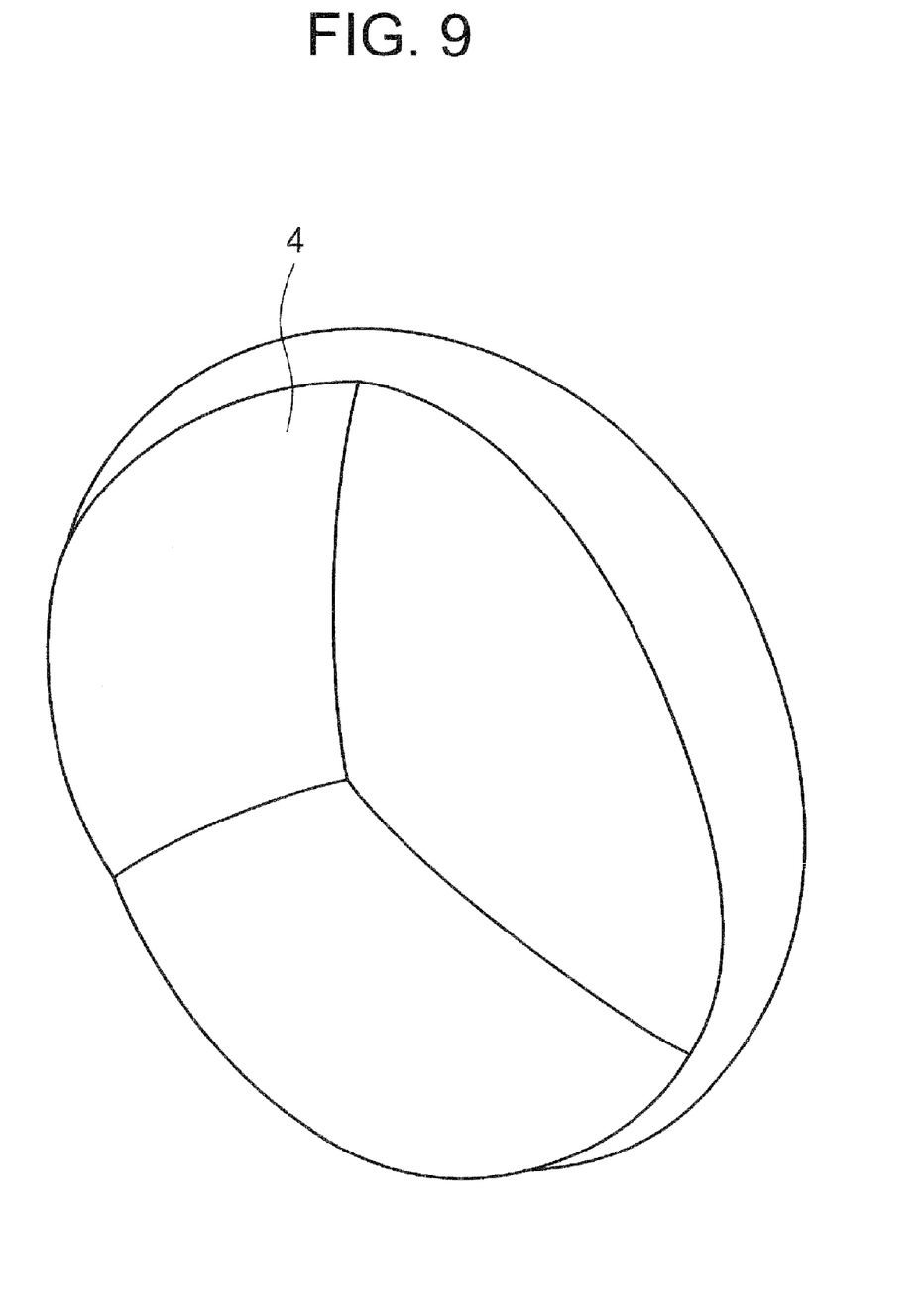
FIG. 9 is a front perspective view of a light receiving lens of the distance measuring device disposed in the projector according to the embodiment of the invention.
Figure 10:
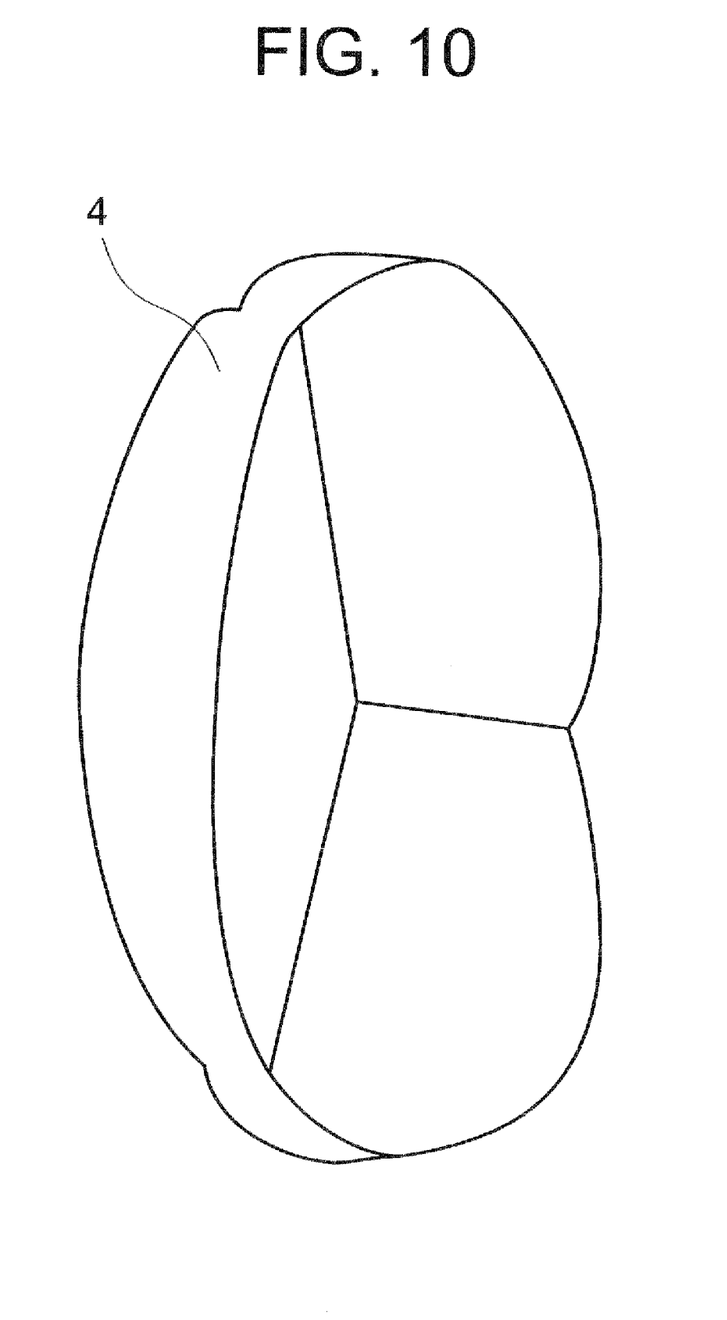
FIG. 10 is a rear perspective view of the light receiving lens of the distance measuring device disposed in the projector according to the embodiment of the invention.

In addition, as is shown in FIGS. 9 and 10, the light receiving lens 4 is made into a single circular disc-shaped lens in which three sector collective lenses are provided side by side in a circumferential direction and optical axes of the three lenses are made to intersect in a predetermined position on a straight line which passes a center of the light receiving lens 4. Each of the respective collective lenses of the light receiving lens 4 is paired with a predetermined one of the three laser light sources 2 so as to emit reflected light which is emitted from the corresponding laser light source 2 and reflected on the screen towards the light receiving element 3. Consequently, the distances to the distance measuring objects on the screen and hence the inclination thereof can be measured by the small distance measuring device 1 which uses the small light receiving lens 4.

Figure 11:
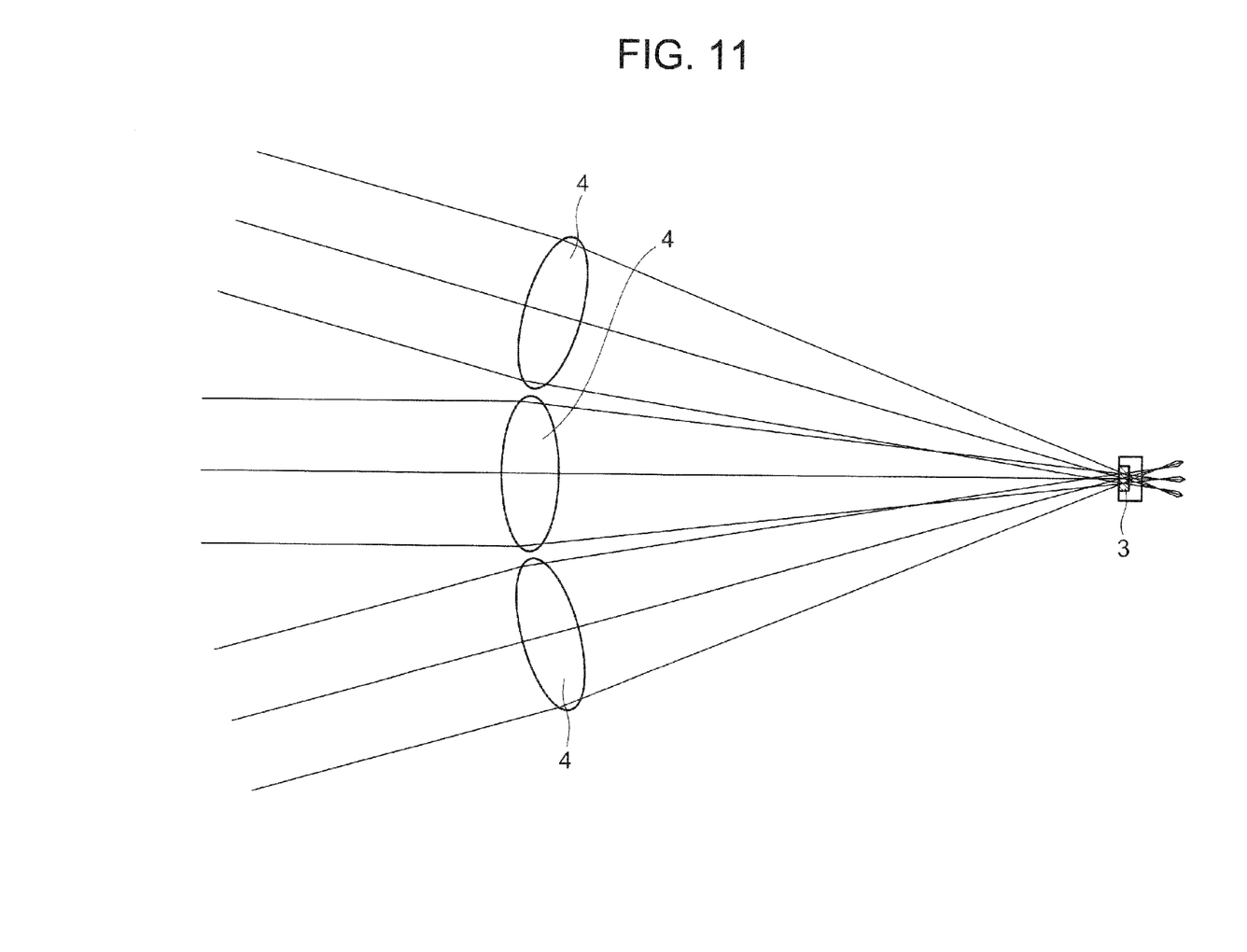
FIG. 11 is a conceptual diagram of light which is incident on the light receiving element after having passed through the light receiving lens in the distance measuring device disposed in the projector according to the embodiment of the invention.

In addition, as is shown in FIG. 11, the light receiving element 3 is disposed in the vicinity of a position where reflected light from long distance or far positions intersect, so that reflected light emitted from the three laser light sources 2 and reflected on the screen is received by the single light receiving element 3 so as to calculate distances to the respective points on the screen from phase differences between the time of transmission and the time of reception. Consequently, the distances to the three distance measuring objects can be measured by the small distance measuring device 1.

Figure 12:
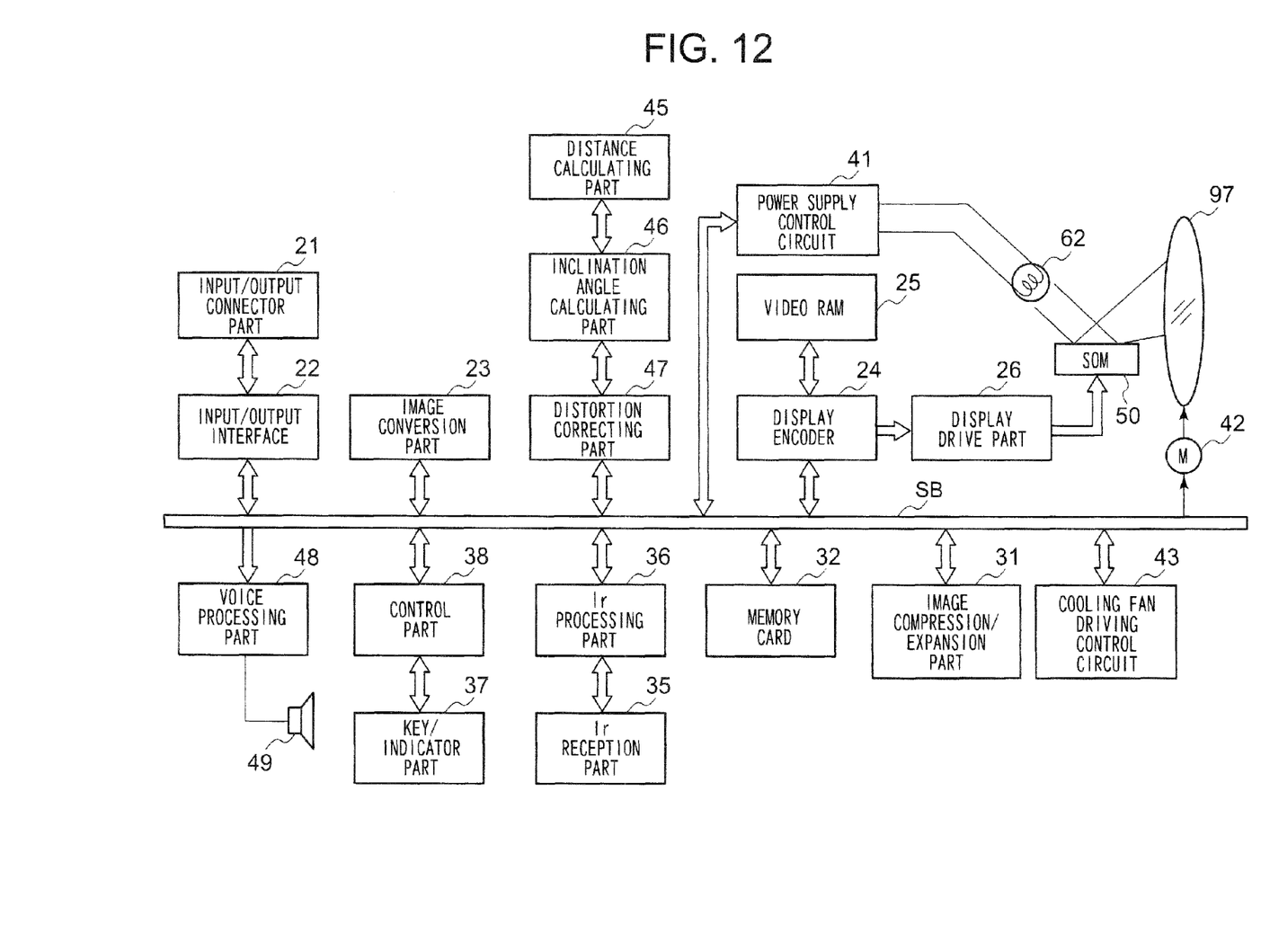
FIG. 12 is a block diagram of a function circuit of the projector according to the embodiment of the invention.

In addition, as is shown in FIG. 12, the projector control unit of the projector 10 has a control part 38, an input/output interface 22, an image conversion part 23, a display encoder 24, a display drive part 26 and the like, whereby image signals of various standards inputted from an input/output connector part 21 are sent to the image conversion part 23 via the input/output interface 22 and a system bus (SB), where the image signals are converted to be integrated into an image signal of a predetermined format which is suitable for display, and thereafter, the image signal so converted is sent to the display encoder 24.

The display encoder 24 deploys the image signal sent thereto on a video RAM 25 so as to cause the image signal to be stored therein and then generates a video signal from the stored contents of the video RAM 25 for output to the display drive part 26.

The display drive part 26 to which the video signal is inputted from the display encoder 24 is such as to drive the display device 50 which is a spatial optical modulator (SOM) at an appropriate frame rate for an image signal sent thereto. The display drive part 26 forms an optical image by reflected light from the display device 50 by causing light from the light source unit 62 to be incident on the display device 50 via the light source side optical system and then projects and displays an image on the screen, not shown, via the projection side optical system. A movable lens group 97 of this projection side optical system is driven by a lens motor 42 for zooming and focusing adjustments.

An image compression/expansion part 31 enables a recording operation in which a luminance signal and a color difference signal of the image signal are data compressed through operations such as ADTC and Huffman coding so as to be written sequentially on a memory card 32 which constitutes a detachable recording medium. In a reproduction mode, the image Compression/expansion part 31 also enables the display of time-varying imageries based on image data stored in the memory card 32 by reading out the image data recorded in the memory card 32, expanding the individual image data which make up a series of time-varying imageries frame by frame and sending them to the display encoder 24 via the image conversion part 23.

The distance calculating part 45 is such as to calculate distances to a plurality of points on the screen and a mean distance thereof from electric signals which are converted from reflected light reflected on the screen and received by the light receiving element 3 of the distance measuring device 1, and an inclination angle calculating part 46 is such as to calculate an inclination angle of the screen from the distances to the plurality of points on the screen which are calculated by the distance calculating part 45. Then, the distance calculating part 45 and the inclination angle calculating part 46 transmit data so calculated to a distortion correcting part 47. In addition, the mean distance between the projector 10 and the screen that is calculated by the distance calculating part 45 is used in focal point adjustments by the lens motor 42.

The distortion correcting part 47 implements a distortion correction on an image to be projected or a projected image based on the data received from the distance measuring part 45 and the inclination angle calculating part 46, transmits an image signal resulting from the correction to the display encoder 24 via the image conversion part 23 and enables the display of an projected image on which the distortion correction has been implemented.

The control part 38 is such as to govern the control of operations in the respective circuits within the projector 10 and is made up of a CPU, a ROM in which operation programs such as various types of settings are fixedly stored and a PAM used as a work memory.

Operation signals from the key/indicator part 37 which is made up of a main key and indicators which are provided on the upper plate 11 of the case main body are sent out directly to the control part 38, and key operation signals from the remote controller are received by the Ir reception part 35, and a code signal which is demodulated in an Ir processing part 36 is sent to the control part 38.

In addition, a voice processing part 48 is connected to the control part 38 via the system bus (SB), and the voice processing part 48 includes a sound source circuit for a sound source such as a PCM sound source and, in a projection mode and a reproduction mode, the voice processing part 48 converts voice data into analog signals and drives a speaker 49 to reproduce sound loudly.

Additionally, this control part 38 controls a power supply control circuit 41, and this power supply control circuit 41 illuminates a discharge lamp of the light source unit 62 when the lamp switch key is operated. Furthermore, the control part 38 also controls a cooling fan driving control circuit 43, and this cooling fan driving control circuit 43 causes a plurality of temperature sensors provided at the light source unit to detect temperatures so as to control the rotating speed of a cooling fan. In addition, the cooling fan driving control circuit 43 causes the cooling fan to continue its rotation even after the lamp is switched off. Furthermore, the cooling fan driving control circuit 43 stops the light source unit depending upon the result of the temperature detections so as to switch off the power supply to the projector main body.

According to the projector 10 of the invention, since the distance the screen can be measured by the small distance measuring device 1 provided thereon, a small projector 10 can be made which can enable an accurate focusing in an autofocus operation or the like.

In addition, by the distance calculating part 45 and the inclination angle calculating part 46 being provided, since the distances to the plurality of points and the mean distance thereof, as well as the inclination angle of the screen can be calculated accurately from the data measured by the distance measuring device 1, the accurate correction can be implemented when the distortion correcting part 47 carries out a correction, thereby making it possible to provide a projector 10 which can project a clear and well-organized image.

Furthermore, as the light receiving lens 4, the plurality of collective lenses are arranged side by side on the single circular disc-shaped lens, and one of the laser light sources is paired with one of the collective lenses, whereby the distances to the plurality of points can be measured without needing wide space, thereby making it possible to miniaturize the projector 10 as well as the distance measuring device 1.

In addition, by the light receiving element 3 being disposed closer to the plurality of collective lenses provided on the light receiving lens 4 than the position where light that has passed through the collective lenses intersect, the distances to the plurality of points can be measured by the single light receiving element 3 without enlarging the light receiving element 3.

Note that while in the embodiment that has been described heretofore, the laser light source has been described as being used as the light source of the distance measuring device 1, the invention is not limited thereto, and hence, LED can also be adopted. In addition, it should be understood that the invention is not limited to the embodiment that has been described above and hence can be modified and/or improved freely without departing from the spirit and scope of the invention.

The invention claimed is:

1. A distance measuring device comprising:
   a light source for emitting light to a distance measuring object;
   a light receiving element for receiving light which has been reflected on the distance measuring object; and
   a light receiving lens for collecting reflected light from the distance measuring object;
   wherein:
   the light receiving element is disposed closer to the light receiving lens than a focal point position where reflected light from the distance measuring object is collected by the light receiving lens,
   the light source comprises a laser light source which emits a laser beam, and a sectional shape of the laser beam which the laser light source emits and which the light receiving element receives has an elliptical shape, and
   the light source is disposed, with respect to the light receiving element, in a longitudinal direction of an ellipse which constitutes the sectional shape of the laser beam which the light receiving element receives.

2. A distance measuring device as set forth in claim 1, wherein a plurality of laser light sources are provided.

3. A distance measuring device as set forth in claim 2, wherein the light receiving lens has a circular disc shape in which a plurality of sector collective lenses are provided side by side in a circumferential direction, and
   wherein one of the plurality of laser light sources is paired with a predetermined one of the collective lenses.

4. A distance measuring device as set forth in claim 3, wherein the light receiving element is disposed in a vicinity of a position where optical axes of the plurality of collective lenses of the light receiving lens intersect.

5. A distance measuring device as set forth in claim 1, further comprising:
   a light receiving barrel which comprises a cylindrical body of a frustum of a circular cone which is open at both end faces, and which is disposed to cover a circumferential edge of the light receiving element;
   wherein:
   the laser light sources are disposed on an outer surface of the light receiving barrel,
   the light receiving element is provided at a center portion on a narrower open end, of the open end faces of light receiving barrel, and
   the light receiving lens is provided to close a wider open end, of the open end faces of light receiving barrel.

6. A projector comprising:
   a light source unit;
   a display device
   a light source side optical system for guiding light from the light source unit to the display device;
   a projection side optical system for projecting an image emitted from the display device onto a screen;
   the distance measuring device set forth in claim 1; and
   a projector control unit which controls the light source unit and the display unit.

7. A projector as set forth in claim 6, wherein the projector control unit comprises a distance calculating part for calculating distances to a plurality of points on the screen and calculating a mean distance thereof, an inclination angle calculating part for calculating an inclination angle of the screen based on the distances to the plurality of points on the screen calculated by the distance calculating part, and a distortion correcting part for preparing image data of a projected image which has been corrected for distortion from information calculated by the distance calculating part and the inclination calculating part.

* * * * *